United States Patent [19]

McIntosh et al.

[11] Patent Number: 4,884,245
[45] Date of Patent: Nov. 28, 1989

[54] QUICK-CONNECTION DRIVE COUPLING FOR MIXING TANK

[75] Inventors: George C. McIntosh, Portsheldon Township, Ottawa County; Robert Gowin, Grand Haven, both of Mich.

[73] Assignee: JWI, Incorporated, Holland, Mich.

[21] Appl. No.: 326,629

[22] Filed: Mar. 21, 1989

[51] Int. Cl.$^4$ ............................................. B01F 7/16
[52] U.S. Cl. ................................ 366/279; 285/401; 366/250; 403/349
[58] Field of Search ............... 366/279, 285, 286, 289, 366/241, 244, 245, 247, 249, 250, 251, 345, 346, 348, 349, 342, 343; 403/349; 285/360, 361, 401, 402, 376

[56] References Cited

U.S. PATENT DOCUMENTS

| | | | |
|---|---|---|---|
| 3,149,888 | 9/1964 | Lennon | 366/285 |
| 3,166,330 | 1/1965 | Boutros . | |
| 3,246,882 | 4/1966 | Clough | 366/286 |
| 3,762,690 | 10/1973 | Harrington | 366/249 |
| 3,815,380 | 6/1974 | Esmay | 403/349 |
| 3,920,227 | 11/1975 | Davis | 366/249 |
| 4,468,358 | 8/1984 | Haegeman | 366/279 |
| 4,606,648 | 8/1986 | Coyle et al. . | |
| 4,708,370 | 11/1987 | Todd | 285/361 |
| 4,721,003 | 1/1988 | Hutchings et al. . | |

Primary Examiner—Robert W. Jenkins
Attorney, Agent, or Firm—Flynn, Thiel, Boutell & Tanis

[57] ABSTRACT

A mixer drive unit includes a motor provided with a housing, and a sleeve-like shroud projects outwardly to be positionable in abutting engagement with a top wall of a tank in surrounding relationship to the projecting end of a mixing shaft. The drive unit has a quick-connect drive coupling disposed within the shroud. The coupling includes a drive plate which has a pair of driving flanges projecting downwardly in cantilevered relationship, which driving flanges are spaced radially outwardly from and on substantially diametrically opposite sides of a driving axis. The driving flanges are positionable substantially on diametrically opposite sides of the mixing shaft when the latter is inserted into a pilot opening in the drive plate. The driving flanges define thereon, in the rotational direction, leading drive faces which abut projecting ends of a drive pin secured to the end of the mixing shaft. The driving flanges, adjacent the free ends thereof, have ramp-like projections which project outwardly in the driving direction so that rotation of the driving flanges causes these ramps to pass under the pin and hold the pin in a channel-like groove defined by the leading face of each driving flange.

7 Claims, 3 Drawing Sheets

QUICK-CONNECTION DRIVE COUPLING FOR MIXING TANK

FIELD OF THE INVENTION

This invention relates to a quick-connection drive coupling associated with a drive unit to permit quick connection to a mixing shaft to permit mixing of a liquid or suspension stored in a tank.

BACKGROUND OF THE INVENTION

Industries which utilize large quantities of paint, such as the automobile industry, typically purchase paint from the paint manufacturers in large tanks which are commonly referred to as "totes". The tank contains therein a substantial quantity of the liquid or suspension, such as paint, to facilitate handling and transporting from the paint manufacturer to the user. The tank normally has a blade-type mixer or agitator positioned internally thereof and attached to a mixing shaft which projects through the top wall of the tank. When the tank arrives at the user location, and when use of the contents is desired, the user attaches a drive unit to the projecting end of the mixing shaft so as to permit mixing of the contents.

In one known arrangement of this type which has been marketed for several years, as sold by Mixing Equipment Co., the drive unit, which is maintained in the user's possession so that only the tanks need to be transported between the paint manufacturer and the user, is attachable to or detachable from the tank so that the drive unit can be readily used for mixing the contents of a large number of tanks. In this known drive unit, however, the attachment to or detachment from the tank is structurally and operationally more complex than desired. For example, the drive unit possesses a coupling arrangement for attachment to the tank which includes two bayonet-type couplings, namely one for attaching the drive housing to the tank, and another for attaching the driving shaft to the mixing shaft. Since a bayonet coupling itself requires a combination of relative axial and rotary movements, the fact that this drive unit requires two such bayonet couplings hence makes attachment and detachment of the drive unit relative to the tank a more complex operation than desired.

Further, in the above arrangement, after the drive housing-tank coupling has been engaged, the operator must then physically grasp and manually lift the mixing shaft upwardly to engage it with the drive coupling followed by relative rotation to lock the shaft to the drive coupling. Such can be a difficult and strenuous manipulation.

Thus, this invention relates to a drive unit having a quick-connect drive coupling associated therewith so that a common drive unit can be readily attached to or detached from a tank which carries its own mixing shaft, whereby the drive unit can be easily and efficiently coupled to or detached from a plurality of such tanks with minimal effort and time, and without requiring manual upward lifting of the mixing shaft. Further, this improved drive unit and specifically the improved quick-connect drive coupling is believed to be of increased structural and operational simplicity.

SUMMARY OF THE INVENTION

The mixer drive unit of this invention includes a motor drive provided with a housing, and a sleeve-like shroud fixed to the housing and projecting outwardly so as to be positioned and then locked in abutting engagement with the top wall of the tank in surrounding relationship to the projecting end of the mixing shaft. The mixing shaft projects outwardly a predetermined extent about the top wall of the tank. Adjacent to but spaced slightly downwardly from the free end of the shaft, a drive pin is mounted on and extends transversely of the mixing shaft so as to project diametrically outwardly from opposite sides thereof. The mixer drive unit has a quick-connect drive coupling associated therewith and disposed within the shroud. The coupling includes a drive plate concentrically disposed within the shroud and secured to the motor drive, which drive plate has a central opening for piloting the upper free end of the mixing shaft. This drive plate has a pair of driving flanges which project downwardly therefrom in cantilevered relationship, which driving flanges are spaced radially outwardly from and on substantially diametrically opposite sides of the driving axis. The driving flanges are positionable substantially on diametrically opposite sides of the mixing shaft when the latter is inserted into the pilot opening. The driving flanges define thereon, in the rotational direction, leading drive faces which abut the projecting ends of the drive pin to effect rotational driving of the mixing shaft. The driving flanges, adjacent the free ends thereof, are provided with ramp-like projections which project outwardly from the drive faces in the driving direction so that rotation of the driving flanges relative to the drive pin causes these ramps to pass under the pin to hold the pin in a channel-like groove defined by the leading face of each driving flange.

Figure 1:
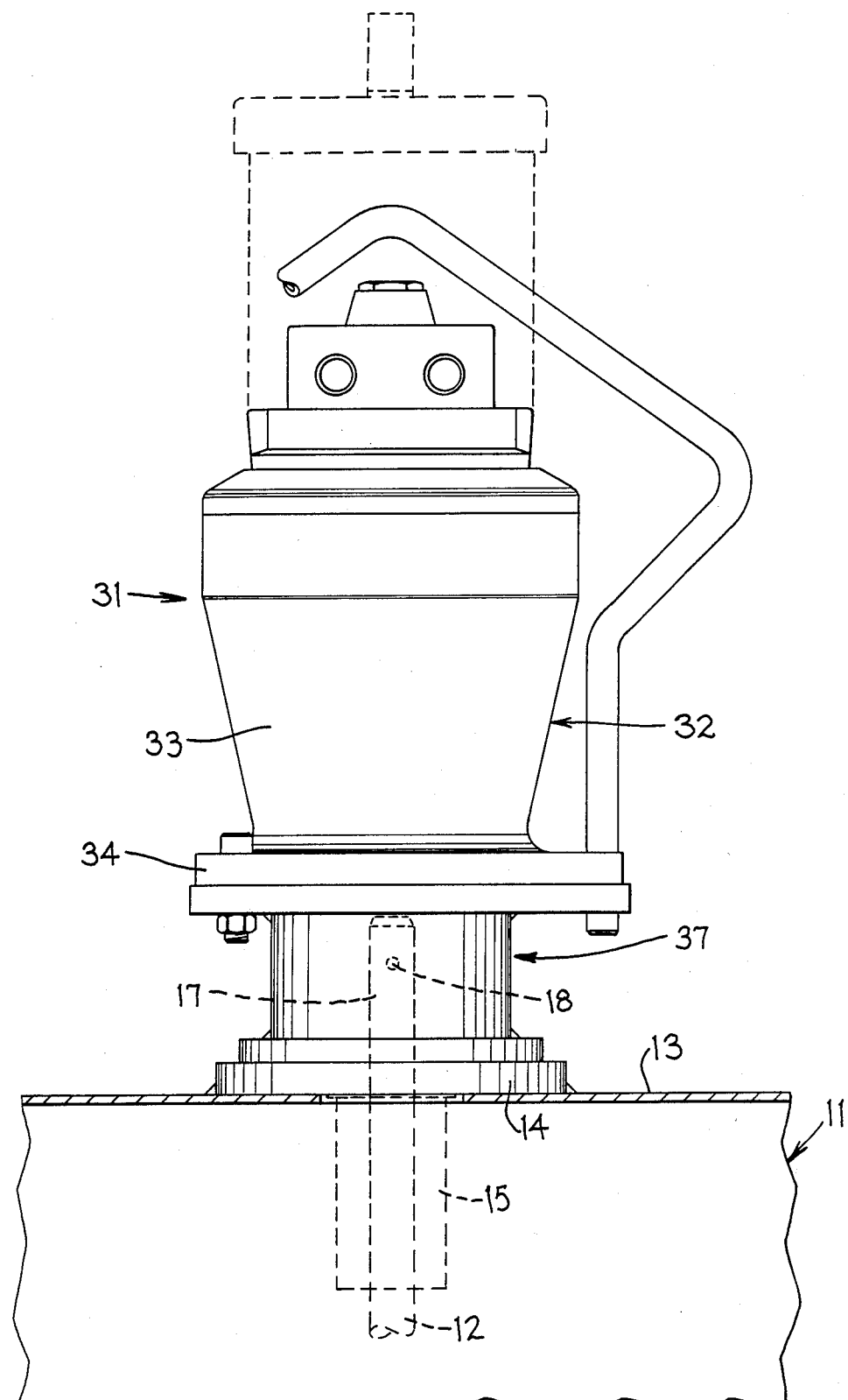
FIG. 1 is an elevational view of the inventive mixer drive unit having a quick-connect coupling associated therewith, and showing attachment to the mixing shaft of a tank, the latter being shown in fragmentary cross section.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from respectively the geometric center of the apparatus and designated parts thereof. Said terminology will include the words specifically mentioned, derivatives thereof, and words of similar import.

DETAILED DESCRIPTION

FIG. 1 illustrates a portion of a conventional storage tank 11 of the type used for holding and shipping liquids or suspensions, such as paint. The tank has a mixing shaft 12 which projects vertically therein and is provided with a conventional blade type agitator or mixer (not shown) at the lower end thereof. This mixing shaft 12 projects vertically through the top wall 13 of the tank. This top wall has a top plate 14 associated therewith for supporting a hub 15 which projects into the tank, the latter mounting bearings 16 for rotatably supporting the mixing shaft 12. Top plate 14 also has a pair of convention L-shaped coupling lugs 14a projecting upwardly on diametrically opposite sides thereof.

The mixing shaft 12 has a cantilevered shaft part 17 which projects outwardly through the top wall of the tank through a predetermined vertical extent. This shaft part 17, at a location spaced slightly downwardly from the free end thereof, has a drive pin 18 fixedly mounted thereon. This drive pin extends perpendicularly through the shaft so that opposite ends of the drive pin project radially outwardly a limited extent on diametrically opposite sides of the shaft. The downward spacing of this drive pin 18 from the upper free end of the shaft part 17 hence results in the shaft having an axially short tip part 19 which is disposed above the drive pin 18.

Figure 2:
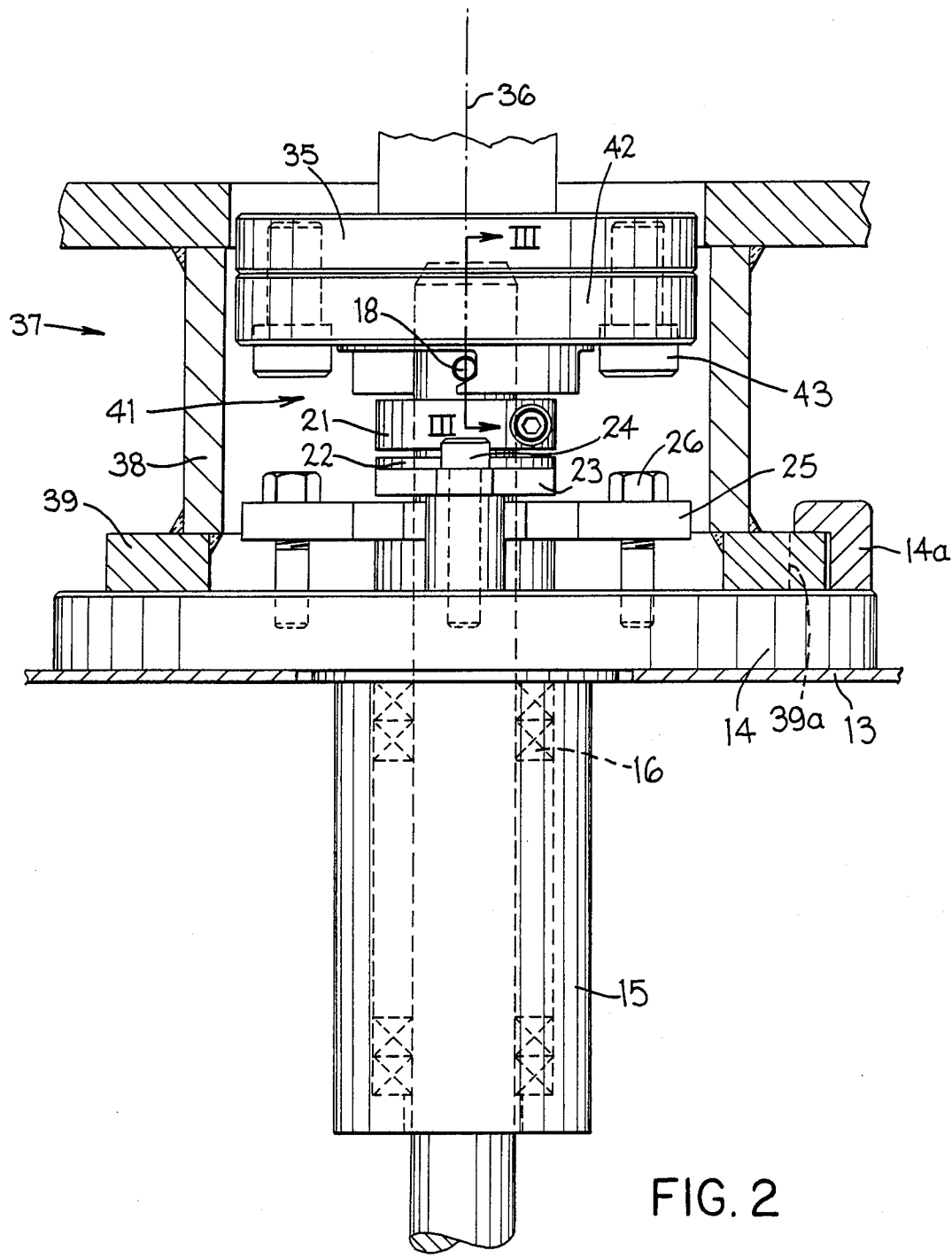
FIG. 2 is an enlarged fragmentary view, partially in cross section, showing the manner in which the quick-connect coupling joins to the mixing shaft.
Figure 3:
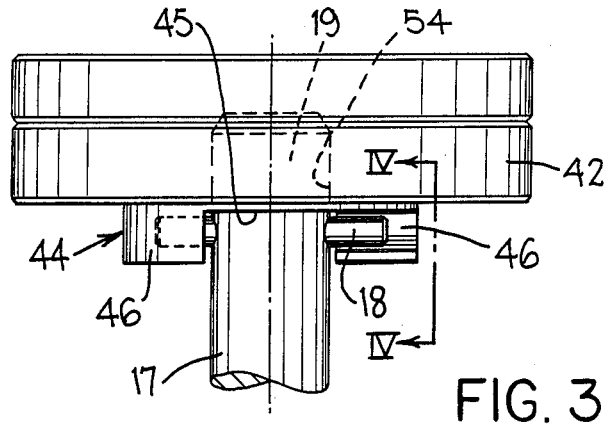
FIG. 3 is a fragmentary view which illustrates the driving engagement between the upwardly projecting end of the mixing shaft and the quick-connect coupling.

The cantilevered shaft part 17 also has an annular shaft collar 21 fixedly secured thereto at a location spaced slightly downwardly from the drive pin 18. This shaft collar is a conventional split collar which is clamped to the shaft. The shaft collar in turn is normally rotatably supported on a bearing washer 22, such as a teflon washer, which surrounds the shaft. Washer 22 bears on the upper surface of a shaft support plate 23, through which projects the shaft part 17, and this plate 23 is fixedly secured to the top plate 14 by conventional fasteners such as screws 24. The shaft 12 can be lifted upwardly a limited axial extent, whereby collar 21 moves upwardly away from the washer 22, such as shown in FIG. 2.

A gland plate 25 also surrounds the shaft part 17, in close proximity to the top plate 14, to create a sealed relationship between the shaft and the tank. This gland plate 25 is secured to the top plate 14 by fasteners such as screws 26.

The general arrangement of the mixing tank 11, as described above, is conventional.

To permit mixing or agitating of the liquid or suspension within the tank 11, there is provided a mixer drive unit 31 according to the present invention, which drive unit can be readily attached to and detached from the drive shaft extension 17 of the tank when mixing is desired. In this manner, a common mixer drive unit 31 can be utilized for mixing the contents of a plurality of like tanks 11.

The drive unit 31 includes a motor section 32 having housing 33 which terminates in an end plate 34. This motor housing confines therein a conventional drive motor, which drive motor may be driven electrically but is conventionally fluid (i.e. air) driven, and has an output member in the form of a rotatable drive plate 35 which rotates generally about an axis 36.

The motor section 32 is connected to a drive coupling section 37, the latter including a sleeve-like shroud 38 which is fixed to the housing end plate 34 and projects concentrically outwardly in surrounding relationship to the drive axis 36. This shroud 38 terminates in an annular end plate 39 which is adapted to be disposed in abutting engagement with the top plate 14 of the tank. This plate 39 has slot-like recesses 39a extending axially therethrough adjacent diametrically opposite sides of the periphery thereof. These recesses permit the lugs 14a to pass therethrough, following which limited rotation of plate 39 relative to plate 14 creates a conventional bayonet-type fixing of the drive unit to the tank.

The drive coupling section 37 includes a drive coupling 41 which is disposed within the shroud 38 and drivingly coupled to the drive plate 35. This drive coupling 41 is designed to automatically create a quick connect or disconnect with the shaft extension 17 of the tank 11 without requiring any manual lifting of the shaft 12.

The drive coupling 41 includes a driving plate 42 which is fixed to the drive plate 35 by fasteners such as screws 43. This driving plate 42 has a drive coupling member 44 coaxially fixed thereto, this member 44 preferably being integrally machined in one piece with the driving plate 42. The drive coupling member 44 defines thereon an exposed axial end face 45, and a pair of drive projections 46 extend axially outwardly (that is downwardly) beyond the end face 45 in a cantilevered relation. These drive projections 46 are uniformly radially spaced outwardly from the drive axis 36 and are spaced 180° apart in the circumferential direction.

Each drive projection 46 defines thereon a leading face (as viewed in the direction of rotation) 47 which is disposed substantially within a plane which extends parallel to the axis 36. This leading face 47 functions as a driving face in that it is adapted to contact the drive pin 18 as described hereinafter.

The drive projection 46, adjacent the free end thereof, also has a cam part 48 which projects outwardly from the lead face 47 in the direction of rotation. This cam part 48 has a generally axially flat bottom or outer free end surface 49 which is flush with the overall end surface of the drive projection 46. However, the cam part 48 has an upper sloped surface 51 which defines a ramp-like cam, this surface 51 extending from its intersection with the leading face 47 and then sloping axially outwardly (that is, downwardly) as it projects outwardly in the direction of rotation until it merges with the bottom surface 49 so as to define a generally sharp or pointed free end. This sloped cam surface 51 is axially spaced downwardly from the axial end face 45 and, in conjunction with the leading face 47, hence defines a channel-like slot which opens in the direction of rotation for confining the drive pin 18 therein, as described below.

Figure 5:
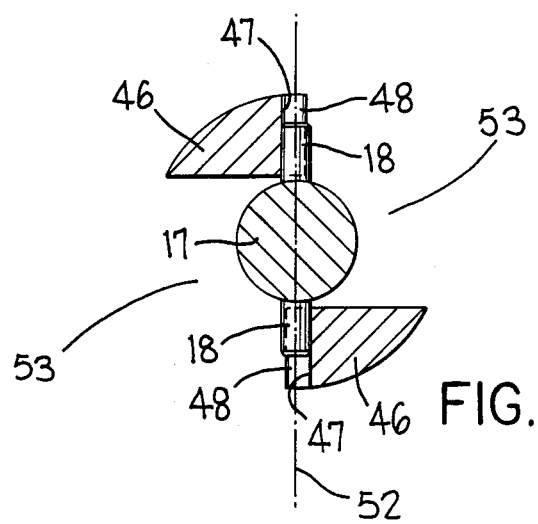
FIG. 5 is a sectional view taken substantially along line V—V in FIG. 4.

As illustrated by FIG. 5, the leading faces 47 of the two drive projections 46 are disposed within parallel planes which themselves extend generally parallel to and are disposed substantially uniformly spaced on opposite sides of an axial plane 52 which contains the axis 36. The leading faces 47 are spaced from this axial plane 52 by a distance which approximately equals the radius of the drive pin 18.

As also illustrated by FIG. 5, each of the drive projections 46 extends circumferentially around the axis 36 through only a small arcuate extent which is preferably significantly less than 90 degrees, and is preferably more in the range of 45 degrees to 70 degrees, thereby leaving large open clearance spaces 53 which extend circumferentially between the two driving projections 46, these clearance spaces 53 each being significantly in excess of 90 degrees. The driving projections 46 are radially spaced outwardly from the axis 36 so as to define a clearance distance therebetween which at least equals the diameter of the shaft extension 17, which clearance is aligned with a piloting bore 54 formed in the driving plate 42, which bore accommodates therein the tip part 19 of the drive shaft extension.

OPERATION

The operation will be briefly described to insure a complete understanding thereof.

When mixing of the contents of the tank 11 is desired, the drive unit 31 is positioned over the tank so that the shroud 38 is aligned above the drive shaft extension 17. The drive unit 31 is then lowered so that lugs 14a pass through recesses 39a and the end plate 39 substantially seats against the top plate 14. The drive unit is then rotated a small extent to axially and circumferentially lock the drive unit to the tank. During this lowering of the drive unit, due to the large arcuate clearance spaces 53, the projecting ends of the drive pin 18 pass into these clearance spaces, and at the same time the tip part 19 of the shaft extension is piloted upwardly into the pilot bore 54. If by chance the drive pin 18 does not properly align with the clearance spaces 53, then a slight relative rotation is sufficient to achieve such alignment, and then permit the drive unit to fit axially downwardly over the drive shaft extension. No other coupling is required.

Figure 4:
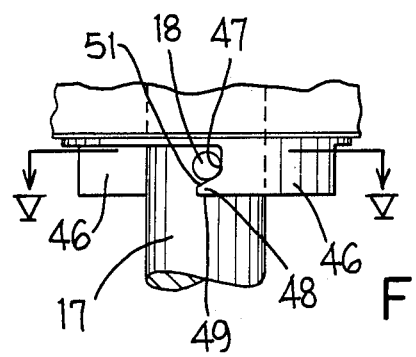
FIG. 4 is a fragmentary view taken substantially along line IV—IV in FIG. 3.

The drive motor is then energized to effect rotation of the drive coupling member 44. This causes the drive projections 46 to rotate into, engagement with the projecting ends of the drive pin 18 so that the drive pins engage the lead faces 47 of the drive projections and hence effect rotation of the mixing shaft 12. During initial rotation of the drive coupling member 44, the cam surfaces 51 may initially engage the underside of the drive pin 18 and cause a small upward lifting of the drive shaft 12 so as to then cause the ends of the drive pin 18 to abut the lead faces 47. Throughout this rotation, the ends of the drive pin 18 are effectively axially confined within the channel-like grooves defined on the leading faces of the drive projections inasmuch as the cam parts 48 effectively pass under the drive pin 18, as illustrated by FIG. 4, and thus effectively create an axial interlock between the tank and the drive unit.

After the mixing of the contents of the tank have been completed, then the motor of the drive unit is deenergized. The drive unit can then be readily disconnected by causing a slight rearward rotation thereof to move the drive projections away from the drive pin, and to release plate 39 from plate 14, following which the complete drive unit can be readily lifted axially away from the tank to effect complete separation. In this fashion, both the connection and disconnection of the drive unit relative to the tank can be easily and positively effected, while at the same time an axial connection of the drive unit to the tank does exists throughout the driving cycle so as to prevent accidental disconnection.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a closed tank containing a liquid therein, the tank having an interior mixing shaft which extends upwardly through a top wall of the tank and has a shaft extension which projects upwardly a predetermined extent above the top wall, the shaft extension having pinlike elements projecting radially outwardly from diametrically opposite sides thereof at a location close to but spaced axially downwardly a small distance from the upper free end of said shaft extension, and a drive unit for releasable attachment to the shaft extension to effect rotation of said mixing shaft, said drive unit comprising:

a motor section including a rotatable drive motor confined within a housing and having a drive member rotatable about an axis;

a sleeve-like shroud fixed to said housing and projecting axially thereof in concentric relationship to said axis, said shroud terminating in an axial free end defined by an annular end plate;

a drive coupling means disposed within said shroud for permitting quick drive connection to and disconnection from said shaft extension when said shroud is positioned in surrounding relationship to said shaft extension so that the annular end plate thereof bears against said top wall;

said drive coupling means including a driving member non-rotatably coupled to said drive member for rotation thereby about said axis, said driving member having a piloting bore formed coaxially thereof for accommodating an upper end part of said shaft extension;

said driving member having a pair of drive-projections which project axially downwardly in cantilevered fashion and are spaced radially outwardly on generally diametrically opposite sides of said axis and define a clearance space diametrically therebetween so as to accommodate said shaft extension, each of said driving projections extending circumferentially around said axis through an arcuate extent which is significantly less than 90 degrees and defining a lead face as viewed in the direction of rotation, said lead face being disposed generally within a plane which extends parallel to said axis, said lead face being adapted to drivingly abut one of the pinlike elements on the shaft extension, and each said driving projection adjacent a lower free end thereof having a ramplike cam part which projects circumferentially outwardly from said lead face in the direction of rotation, said ramplike cam part being adapted to circumferentially extend beneath the respective pinlike element to create an axial coupling of the drive unit to the tank; and the circumferentially extending regions which extend between said driving projections constituting opened clearance spaces for permitting relative axial movement between the drive coupling means and the tank to permit either quick connection or disconnection therebetween.

2. A combination according to claim 1, wherein said lead faces on said drive projections are generally parallel with one another and are disposed in generally parallel planes which themselves are substantially parallel to but disposed on opposite sides of a third plane which contains said axis.

3. A combination according to claim 2, wherein said driving member has a downwardly-facing axial end face, said driving projections projecting downwardly in cantilevered fashion from said end face, whereby said end face is spaced axially upwardly from the ramplike cam part and in conjunction with the respective lead face defines a generally channel-like groove which opens in the direction of rotation for captivating the pinlike element therein.

4. A combination according to claim 3, wherein each of said driving projections extends around through an arcuate extent of no more than about 70 degrees.

5. A combination according to claim 1, including a bayonet-type coupling cooperating between said top wall and said annular end plate.

6. A portable drive unit for releasable attachment to a shaft extension to effect rotation of a mixing shaft, which extends upwardly through a top wall of a liquid-containing tank, the shaft extension having pinlike elements projecting radially outwardly from opposite sides thereof at a location adjacent the upper free end thereof, said drive unit comprising:

a motor section including a rotatable drive motor confined within a housing and having a drive member rotatable about an axis;

a sleeve-like shroud fixed to said housing and projecting axially thereof in concentric relationship to said axis, said shroud terminating in an axial free end defined by an annular end surface; permitting quick drive connection to and disconnection from the shaft extension when said shroud is positioned in surrounding relationship to the shaft extension so that the annular end surface thereof bears against the top wall of the tank;

said drive coupling means including a driving member non-rotatably coupled to said drive member for rotation thereby about said axis, said driving member having a piloting bore formed coaxially thereof for accommodating an upper end part of the shaft extension;

said driving member having a pair of drive projections which project axially downwardly in cantilevered fashion and are spaced radially outwardly on generally diametrically opposite sides of said axis and define a clearance space diametrically therebetween so as to accommodate the shaft extension, each of said driving projections extending circumferentially around said axis through an arcuate extent which is significantly less than 90 degrees and defining a lead face as viewed in the direction of rotation, said lead face being disposed generally within a plane which extends parallel to said axis, said lead face being adapted to drivingly abut one of the pinlike elements on the shaft extension, and each said driving projection adjacent a lower free end thereof having a ramplike cam part which projects circumferentially outwardly from said lead face in the direction of rotation, said ramplike cam part being adapted to circumferentially extend beneath the respective pinlike element to create an axial coupling of the drive unit to the tank; and the circumferentially extending regions which extend between said driving projections constituting open clearance spaces for permitting relative axial movement between the drive coupling means and the tank to permit either quick connection or disconnection therebetween.

7. A drive unit according to claim 6, wherein said driving member has a downwardly-facing axial end face, said driving projections projecting downwardly in cantilevered fashion from said end face, whereby said end face is spaced axially upwardly from the ramplike cam part and in conjunction with the respective lead face defines a generally channel-like groove which opens in the direction of rotation for captivating the pinlike element therein.

* * * * *

UNITED STATES PATENT AND TRADEMARK OFFICE
CERTIFICATE OF CORRECTION

PATENT NO. : 4 884 245

DATED : November 28, 1989

INVENTOR(S) : George C. McIntosh et al

It is certified that error appears in the above-identified patent and that said Letters Patent is hereby corrected as shown below:

Column 6, lines 26 and 27; change "drive-projections" to ---drive projections---.

Column 7, line 2; after "around" insert ---said axis---.

Column 7, line 20; before "permitting" start a new paragraph and insert ---a drive coupling means disposed within said shroud for---.

Signed and Sealed this

Eighteenth Day of December, 1990

Attest:

HARRY F. MANBECK, JR.

*Attesting Officer*  *Commissioner of Patents and Trademarks*